(12) United States Patent
Oshins

(10) Patent No.: US 8,607,253 B2
(45) Date of Patent: *Dec. 10, 2013

(54) VIRTUALIZED STORAGE ASSIGNMENT METHOD

(71) Applicant: Microsoft Corporation, Redmond, WA (US)

(72) Inventor: Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,251

(22) Filed: Nov. 7, 2012

(65) Prior Publication Data

US 2013/0067501 A1    Mar. 14, 2013

Related U.S. Application Data

(63) Continuation of application No. 12/248,299, filed on Oct. 9, 2008, now Pat. No. 8,321,878.

(51) Int. Cl.
*G06F 9/44* (2006.01)
(52) U.S. Cl.
USPC .......................................... 719/321; 719/327
(58) Field of Classification Search
USPC .................................................. 719/321, 327
See application file for complete search history.

(56) References Cited

U.S. PATENT DOCUMENTS

| | | | |
|---|---|---|---|
| 6,026,485 A | 2/2000 | O'Connor et al. | |
| 6,038,643 A | 3/2000 | Tremblay et al. | |
| 6,647,454 B1 * | 11/2003 | Solomon | 710/310 |
| 6,904,477 B2 | 6/2005 | Padmanabhan et al. | |
| 6,959,440 B1 | 10/2005 | Shah | |
| 7,080,172 B1 | 7/2006 | Schmalz | |
| 7,185,078 B2 * | 2/2007 | Pleyer et al. | 709/223 |
| 7,222,348 B1 | 5/2007 | Athreya et al. | |
| 7,305,591 B2 | 12/2007 | Do et al. | |

(Continued)

FOREIGN PATENT DOCUMENTS

WO    WO 2008/068132    6/2008

OTHER PUBLICATIONS

"Microsoft Launches Multipath I/O," http://www.byteandswitch.com/document.asp?doc_id=20740, 2002, 1-3.

(Continued)

*Primary Examiner* — Van Nguyen
(74) *Attorney, Agent, or Firm* — Woodcock Washburn, LLP

(57) ABSTRACT

Various aspects are disclosed for building a device driver stack in a virtual machine partition that does not physically control the device represented by the stack. In an embodiment, a secondary interface and driver for an I/O device may be instantiated. Information from an I/O virtualization layer describing the devices that the associated driver may control may be requested. A multi-path redirection layer may provide a handle to an existing stack that includes a driver for the I/O device. This existing stack may then be used to communicate with the device and allow the creation of a new stack including an object representing the device and a new driver for the device. The multi-path redirection layer may then open a handle to the new stack and inform the device virtualization layer, which may then ask the existing device interface to relinquish control of the device to the newly created interface.

20 Claims, 17 Drawing Sheets

(56) References Cited

U.S. PATENT DOCUMENTS

| | | | |
|---|---|---|---|
| 7,376,869 B2 | 5/2008 | Aiello et al. | |
| 7,409,694 B2 | 8/2008 | Forin et al. | |
| 7,568,236 B2 | 7/2009 | Gbadegesin et al. | |
| 7,584,473 B2 | 9/2009 | Forin et al. | |
| 7,620,784 B2 * | 11/2009 | Panabaker | 711/157 |
| 7,782,869 B1 | 8/2010 | Chitlur Srinivasa | |
| 7,783,788 B1 | 8/2010 | Quinn et al. | |
| 7,788,665 B2 | 8/2010 | Oshins | |
| 7,792,923 B2 | 9/2010 | Kim | |
| 7,836,215 B2 | 11/2010 | Fuente | |
| 7,877,760 B2 | 1/2011 | Oney et al. | |
| 7,941,812 B2 | 5/2011 | Sekar | |
| 8,041,849 B2 | 10/2011 | Mukker et al. | |
| 8,321,878 B2 * | 11/2012 | Oshins | 719/321 |
| 2002/0069245 A1 | 6/2002 | Kim | |
| 2004/0172636 A1 | 9/2004 | Do et al. | |
| 2005/0091441 A1 | 4/2005 | Qi et al. | |
| 2006/0005186 A1 | 1/2006 | Neil | |
| 2006/0047850 A1 | 3/2006 | Singh Bhasin et al. | |
| 2006/0212870 A1 | 9/2006 | Arndt et al. | |
| 2006/0230216 A1 | 10/2006 | Fuente | |
| 2007/0165660 A1 | 7/2007 | Fang et al. | |
| 2007/0192561 A1 | 8/2007 | Satoyama et al. | |
| 2008/0082975 A1 | 4/2008 | Oney et al. | |
| 2008/0147887 A1 | 6/2008 | Freimuth et al. | |
| 2008/0184273 A1 | 7/2008 | Sekar | |
| 2009/0037941 A1 | 2/2009 | Armstrong et al. | |
| 2009/0307377 A1 | 12/2009 | Anderson et al. | |
| 2010/0095310 A1 | 4/2010 | Oshins | |

OTHER PUBLICATIONS

Chhuor, C., "Multipath Storage with Xen and DS4800," http://www.ibm.com/developerworks/linux/library/I-multipath-xen/index.html, 2008, 1-21.

European Patent Application No. 09819670.2, Supplemental European Search Report dated Apr. 18, 2012, 6 pages.

PCT Application No. PCT/US2009/059124: International Search Report and Written Opinion of the International Searching Authority, May 19, 2010, 11 pages.

Ueda et al., "Request-Based Device-Mapper Multipath and Dynamic Load Balancing," http://www.linuxinsight.com/files/ols2007/ueda-reprint.pdf, 2007, 235-244.

* cited by examiner

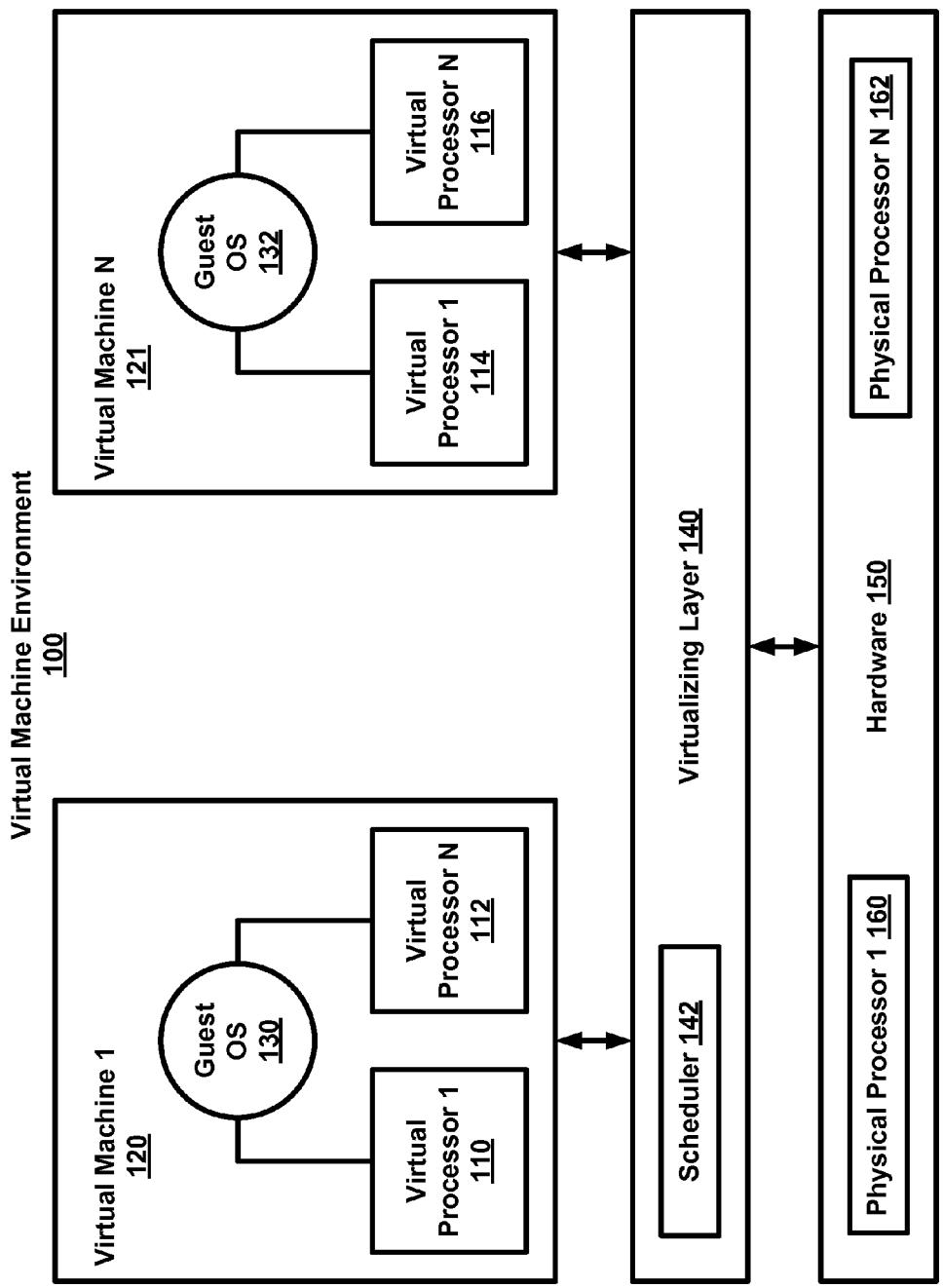

VIRTUALIZED STORAGE ASSIGNMENT METHOD

CROSS REFERENCE TO RELATED APPLICATIONS

This application is a continuation of U.S. patent application Ser. No. 12/248,299, filed Oct. 9, 2008, now U.S. Pat. No. 8,321,878, which is incorporated herein by reference in its entirety.

TECHNICAL FIELD

The presently disclosed subject matter relates to the field of computing, and more particularly, to computer virtualization, although virtualization is merely an exemplary and non-limiting field.

BACKGROUND

Virtual machine systems can suffer from poor performance with respect to input/output (I/O) functions because in a completely virtualized system, every I/O operation is typically handled indirectly by a hypervisor, a host operating system or by a separate virtual machine executing on the machine, thus increasing the costs of executing the I/O functions. One way to mitigate such performance issues is by allowing a virtual machine to take direct control of some of the physical hardware resources in the system. However, providing such direct control may have the effect of rendering the virtual machine incompletely virtualized, and many of the features associated with virtualization (saving, migrating, snap-shotting, etc.) may become difficult to accomplish.

Another way to address such I/O performance issues is to create multiple paths to an I/O device, wherein one path may travel directly to the hardware, and another path may travel indirectly to the hardware via another virtual machine. When it is desired to fully encapsulate a virtual machine's state so that it can be saved or migrated, the direct path may be torn down and the indirect path may be used. One problem with creating multiple paths is that it is typically difficult to set up a second path without giving control of the device to the second path as part of the setup process. If the I/O device is used for paging code or data and control of the paging device is passed to the second path before it is completely operational, paging may stop and cause the system to crash.

Accordingly, other techniques are needed in the art to solve the above described problems.

SUMMARY

Various methods and systems are disclosed herein for building a device driver stack in a virtual machine partition that does not physically control the device represented by the stack. In an embodiment, a secondary interface and associated driver for an I/O device may be instantiated. Information from an I/O virtualization layer may be requested, the information describing the devices that the associated driver may control. A multi-path redirection layer may provide a handle to an existing stack that includes a driver for the I/O device. This existing stack may then be used to communicate with the device and allow the creation of a new stack including an object representing the device and a new driver for the device. The multi-path redirection layer may then open a handle to the new stack and inform the device virtualization layer, which may then send a request to the existing device interface to relinquish control of the device to the newly created interface. The device may now be controlled by the new interface and I/O may be redirected to the device via the new driver and interface.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 1A illustrates a virtual machine environment, with a plurality of virtual machines, comprising a plurality of virtual processors and corresponding guest operating systems; the virtual machines are maintained by a virtualizing layer which may comprise a scheduler and other components, where the vitualizing layer virtualizes hardware for the plurality of virtual machines;

DETAILED DESCRIPTION OF ILLUSTRATIVE EMBODIMENTS

Virtual Machines In General Terms

Figure 1B:
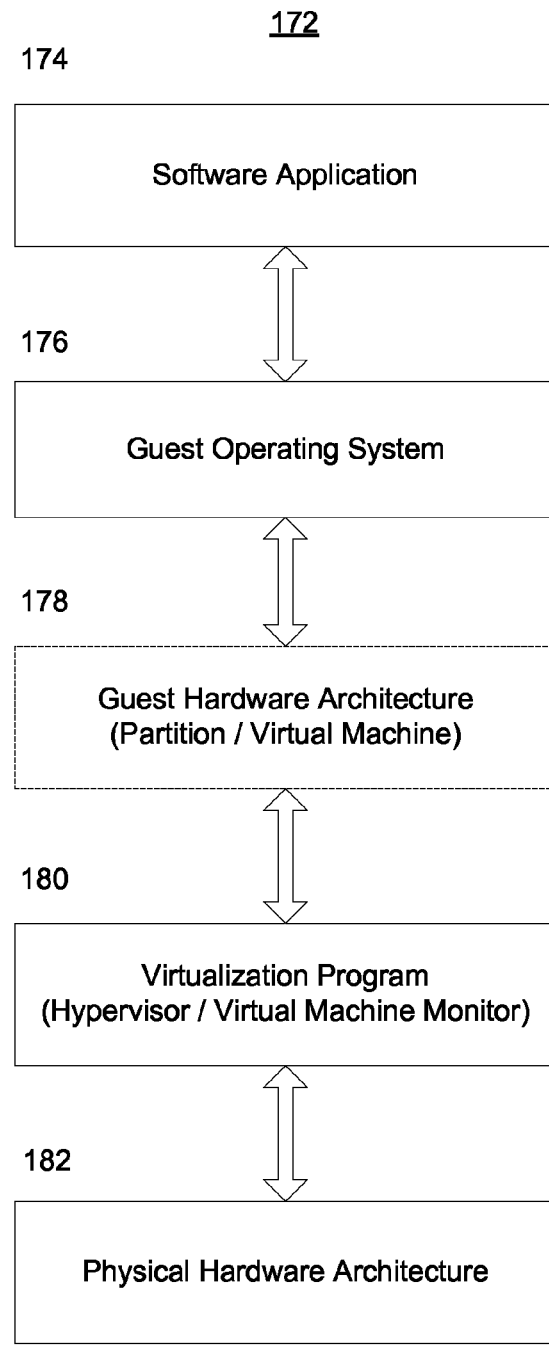
FIG. 1B illustrates a diagram representing the logical layering of the hardware and software architecture for a virtualized environment in a computer system.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

With virtual machines, a single physical machine can support a number of guest operating systems, each of which runs on its own complete virtual instance of the underlying physical machine. The guest Operation Systems (OS's) can be instances of a single version of one OS, different releases of the same OS, or completely different OS's. A thin software layer called a virtual machine monitor (VMM) or hypervisor may create and control the virtual machines and other virtual subsystems. The VMM may also take complete control of the physical machine and provide resource guarantees for CPU, memory, storage space, and I/O bandwidth for each guest OS.

FIG. 1A illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

FIG. 1B is a diagram representing the logical layering of the hardware and software architecture for a virtualized environment in a computer system. In FIG. 1B, a virtualization program 180 runs directly or indirectly on the physical hardware architecture 182. The virtualization program 180 may be (a) a virtual machine monitor that runs alongside a host operating system, (b) a host operating system with a hypervisor component, where the hypervisor component performs the virtualization, (c) hardware, or (d) micro-code. The virtualization program may also be a hypervisor which runs separately from any operating system. In other words, the hypervisor virtualization program need not run as part of any operating system, and need not run alongside any operating system. The hypervisor virtualization program may instead run "under" all the operating systems, including the "root partition." The virtualization program 180 virtualizes a guest hardware architecture 178 (shown as dashed lines to illustrate the fact that this component is a "partition" or a "virtual machine"), that is, hardware that does not actually exist but is instead virtualized by the virtualizing program 180. A guest operating system 176 executes on the guest hardware architecture 178, and a software application 174 can run on the guest operating system 176. In the virtualized operating environment of FIG. 1B, the software application 174 can run in a computer system even if the software application 174 is designed to run on an operating system that is generally incompatible with a host operating system and the hardware architecture 182.

A virtual machine typically contains an entire operating system and a set of applications, which together constitute many processes, the entirety of which may be referred to as "workload" or "process" in the context of virtual machines. In the present disclosure the terms "process" and "workload" may be used interchangeably in the context of virtual machines, and those skilled in the art will readily understand that "process" may refer to multiple processes including all of systems and applications that may be instantiated in a virtual machine.

Figure 2:
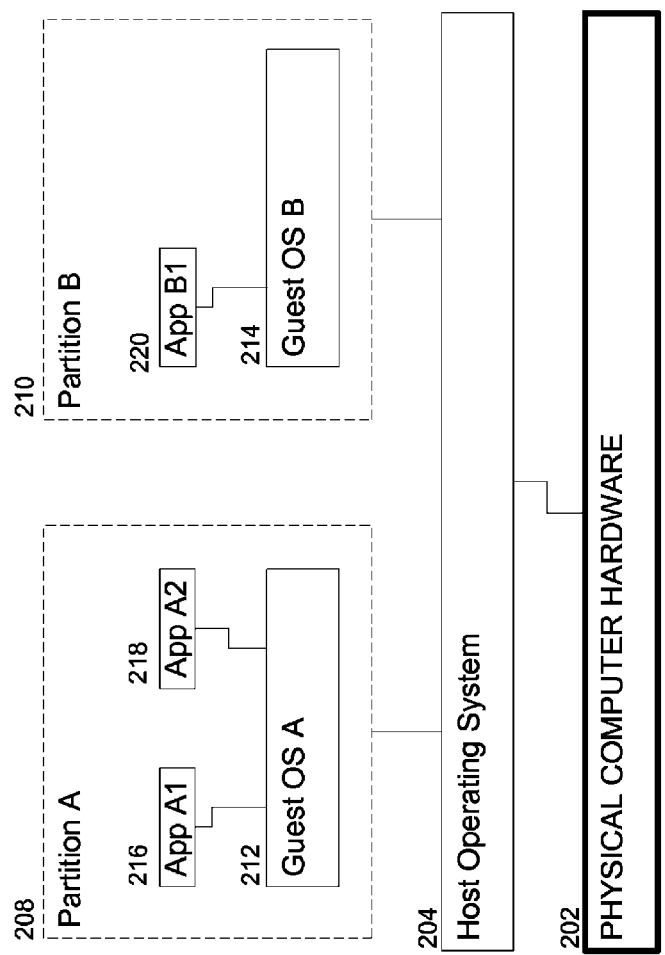
FIG. 2 illustrates an exemplary virtualized computing system.

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that may exist only as software constructs. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
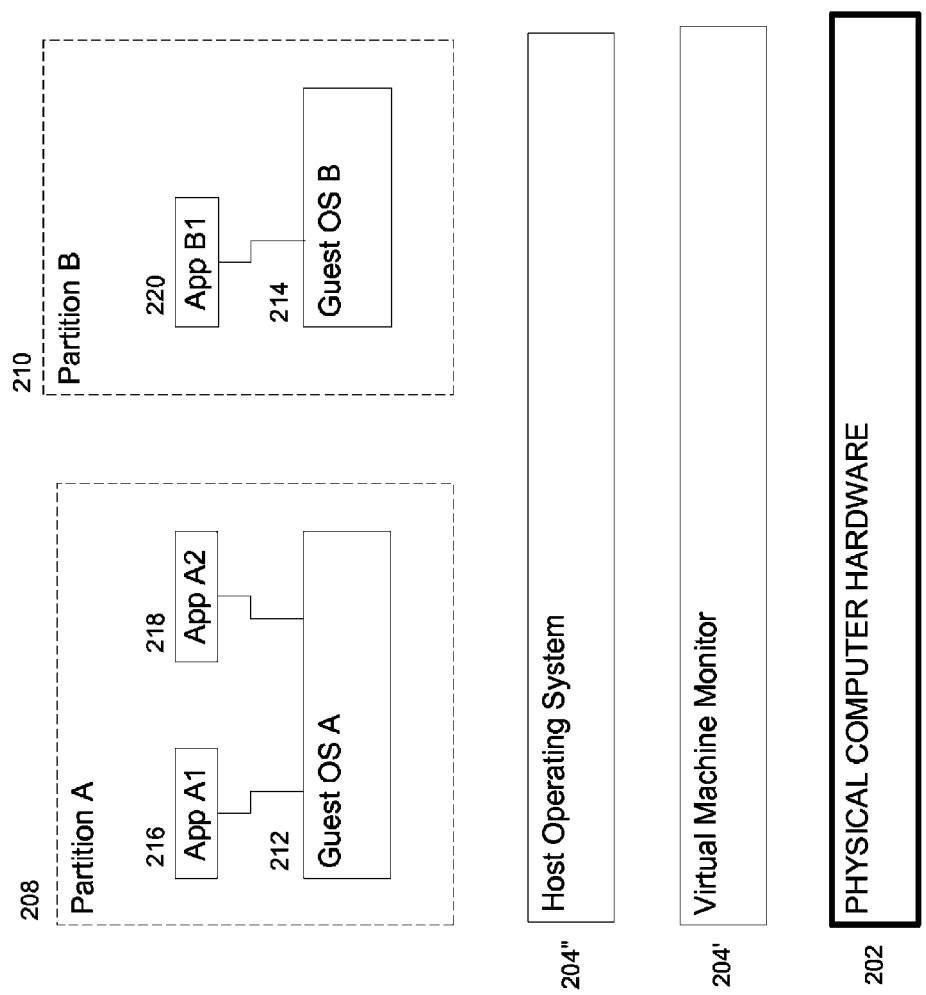
FIG. 3 illustrates an alternative virtualized computing system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Virtualized Storage Assignment

I/O virtualization (IOV) refers to the capability for a single physical I/O device to be shared by more than one virtual machine or between the hypervisor (or VMM, etc.) and a virtual machine. Virtual machine systems can suffer from poor performance with respect to I/O virtualization. This is because the characteristics of virtualization that make it useful (e.g., isolation from the physical hardware) can have negative effects when running a workload in a virtual machine. In a completely virtualized system, every I/O operation is typically handled indirectly, either by a hypervisor, a host operating system or by a separate virtual machine running on the machine. One way to mitigate poor I/O performance may be to allow a virtual machine to take direct control of some of the physical hardware in the system. However, allowing direct control may have the effect of rendering the virtual machine incompletely virtualized, in which case many of the features associated with virtualization (e.g., saving, migrating, snap-shotting, etc.) may become difficult to accomplish.

Commonly assigned U.S. patent appln. No. [Attorney Docket No.: MSFT-5556/316010.01] describes techniques for addressing the above issue. For example, multiple paths to an I/O device may be created. One path may travel directly to the hardware, and another path may travel indirectly to the hardware via another virtual machine. When it is desired to fully encapsulate a virtual machine's state so that it can be saved or migrated, the direct path may be torn down and the indirect path may be used. The indirect path is inherently virtualizable.

However, a problem may arise in building the two paths, in particular if the I/O device is used for paging code or data. It is typically difficult to set up the second path without giving control of the device to the second path as part of the setup process. If control of the paging device is given to the second path before the paging device is completely operational, errors may occur and paging may stop. In many situations, if paging is stopped the system may crash.

Figure 4:
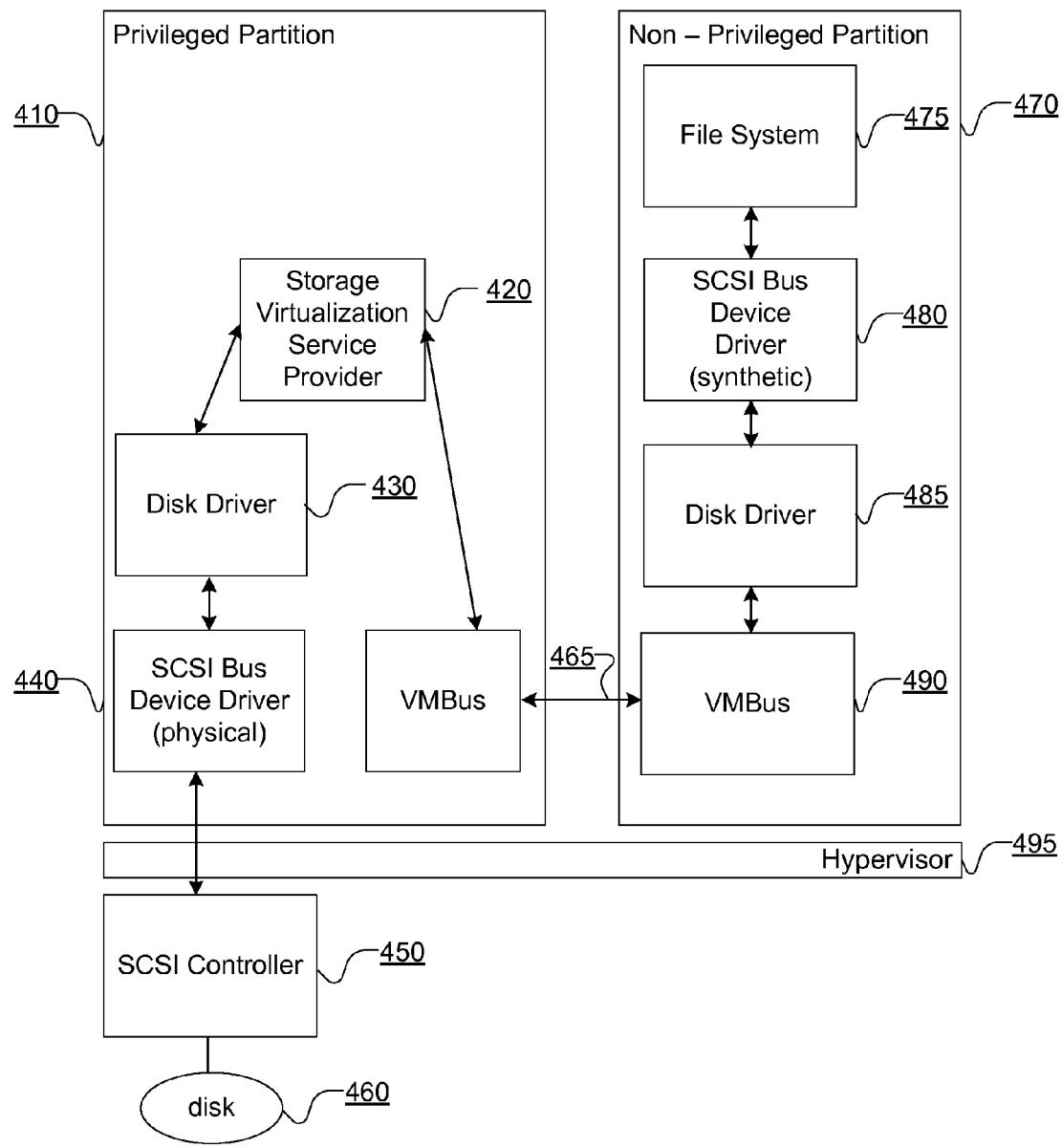
FIG. 4 depicts an exemplary system diagram illustrating a process for implementing the present disclosure.

Referring to FIG. 4, illustrated is a diagram of a purely "synthetic" storage subsystem. A synthetic stack is an I/O stack made up of drivers that are typically designed for use within a virtual machine. Other terms may be used to refer to a synthetic stack depending on the particular system. For example, a term used for a similar I/O stack in alternate systems is "paravirtualized." Referring to FIG. 4, the diagram illustrates two partitions. One partition is a privileged partition 410 with direct physical access to disk 460. The other partition is a non-privileged partition 470 that may request access to disk 460. For example, file system 475 may request access to files requiring a synthetic SCSI bus driver 480 to communicate with disk driver 485, which then communicates over the VM Bus 465. A storage virtualization service provider 420 may provide virtualized storage services. The storage virtualization service provider 420 may communicate to disk driver 430 to access the physical SCSI bus device driver 440. The SCSI bus device driver 440 may provide access to the SCSI controller 450 and ultimately to the files residing on disk 460 (typically occurring at the block layer). Thus one virtual machine indicated as the privileged partition 410 has control of the physical storage device which is the SCSI controller 450. Another virtual machine, indicated as the non-privileged partition 470, may seek access to the SCSI controller 450.

Figure 5:
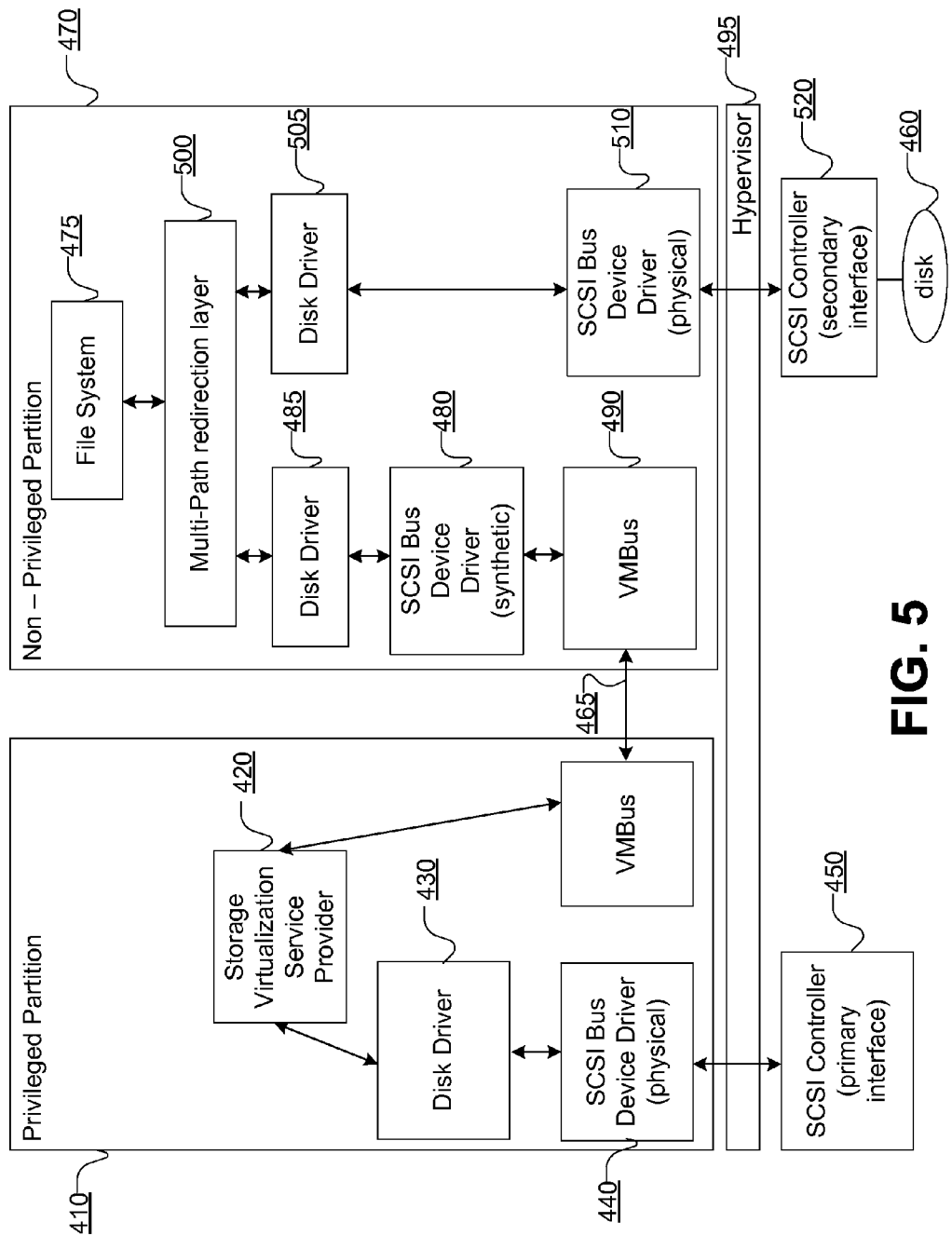
FIG. 5 depicts an exemplary system diagram illustrating a process for implementing the present disclosure.

Referring now to FIG. 5, illustrated is an exemplary end state after building a second path to the disk 460. The non-privileged partition 470 has physical control over disk 460 via a secondary SCSI controller 520. This access is provided by a secondary stack comprising physical SCSI bus device driver 510 and disk driver 505. A synthetic stack providing a first path comprises disk driver 485 and synthetic SCSI bus driver 480, which then communicates over the VM Bus 465. Storage virtualization service provider 420 may provide virtualized storage services. The storage virtualization service provider 420 may communicate to disk driver 430 to access the physical SCSI bus device driver 440. The SCSI bus device driver 440 may provide access to the SCSI controller 450, which provides a primary interface to disk 460. A multi-path redirection layer 500 is provided in the non-privileged partition 470 and manages and controls access to the two stacks.

One problem that can arise is that in order to build a disk driver layer in either of the paths within an operating system instance in the non-privileged partition, control of the storage disk 460 may be required. The processes necessary to build the two stacks of device drivers will typically require reading from the disk that is the boot device and effecting disk activity through paging code and data. While this may be possible, in most configurations the SCSI controller cannot simultaneously control a disk from both its primary and secondary interfaces. Those skilled in the art will recognize that the application of the current disclosure to SCSI devices is exemplary and that the disclosed methods and systems may be applied to other I/O devices such as, but not limited to, Serial Attached SCSI (SAS), internet SCSI (iSCSI), and FibreChannel.

In various embodiments, disclosed herein is a process for constructing the second I/O path or stack. While the following will describe the process of starting with the synthetic I/O stack and building the physical stack, those skilled in the art will recognize that a similar process may be used to start with the synthetic I/O stack and build the physical stack.

Figure 6:
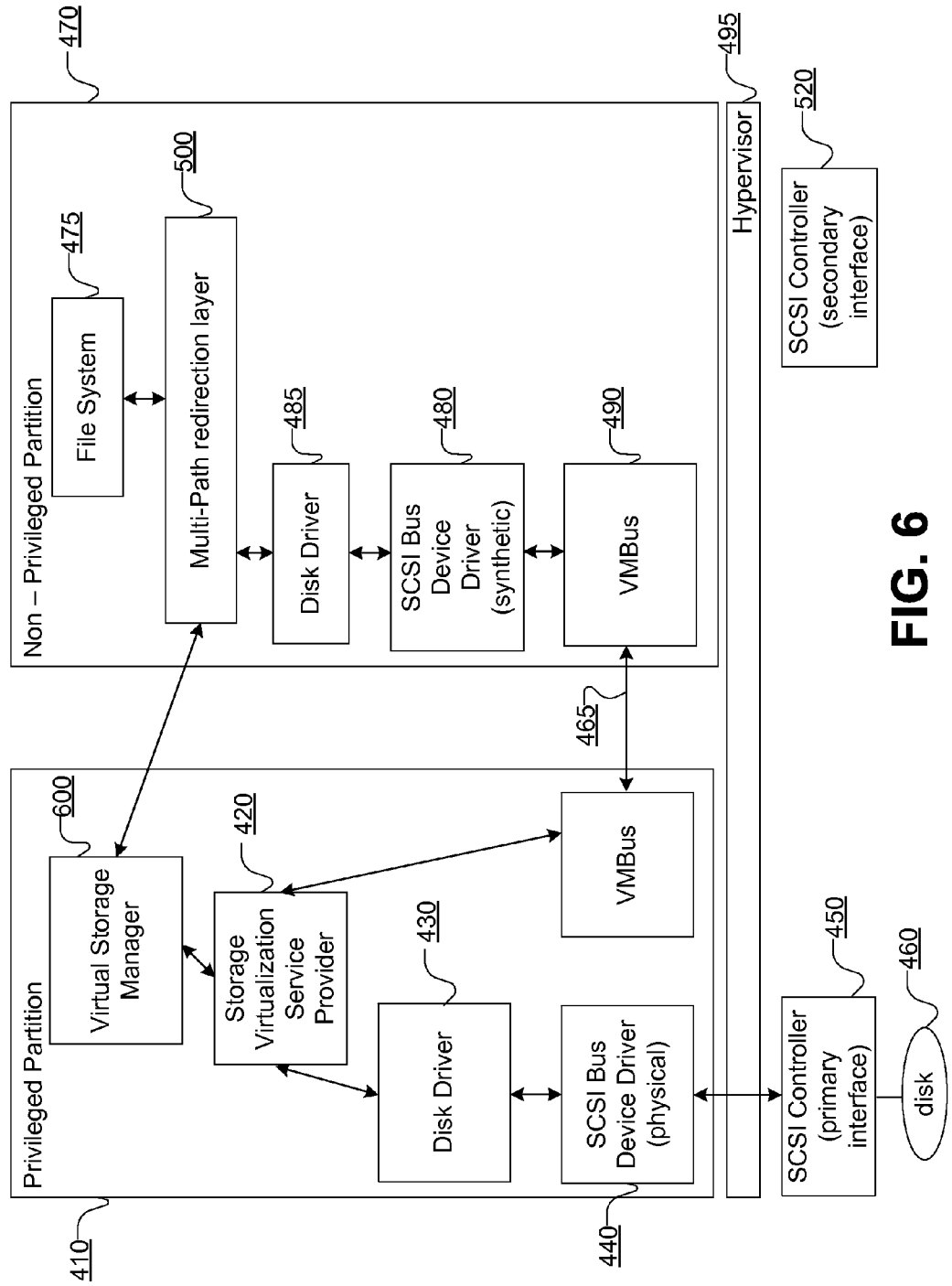
FIG. 6 depicts an exemplary system diagram illustrating a process for implementing the present disclosure.

In some embodiments the SCSI controller may be asked to create a secondary interface to itself. Some devices are capable of performing such operations, particularly those that are compliant with the Peripheral Component Interconnect (PCI) Special Interest Group's (SIG's) Single-Root (SR) I/O Virtualization (IOV) Specification. Referring to FIG. 6, a virtual storage manager 600 is provided that may manage the allocation of resources to a virtual machine and isolate resources assigned to a virtual machine from access by other virtual machines. The virtual storage manager 600 may send a message to the SCSI controller 450 via its physical SCSI bus device driver 440. The SCSI controller 450 may then create a secondary SCSI controller interface 520. As mentioned above, the present disclosure contemplates application of the disclosed methods to various storage controllers other than SCSI controllers. Some controllers may connect to the storage medium in multiple fashion, for example in a Storage Area Network (SAN), such that multiple controllers may be used rather than a single SR-IOV-compliant controller.

Figure 7:
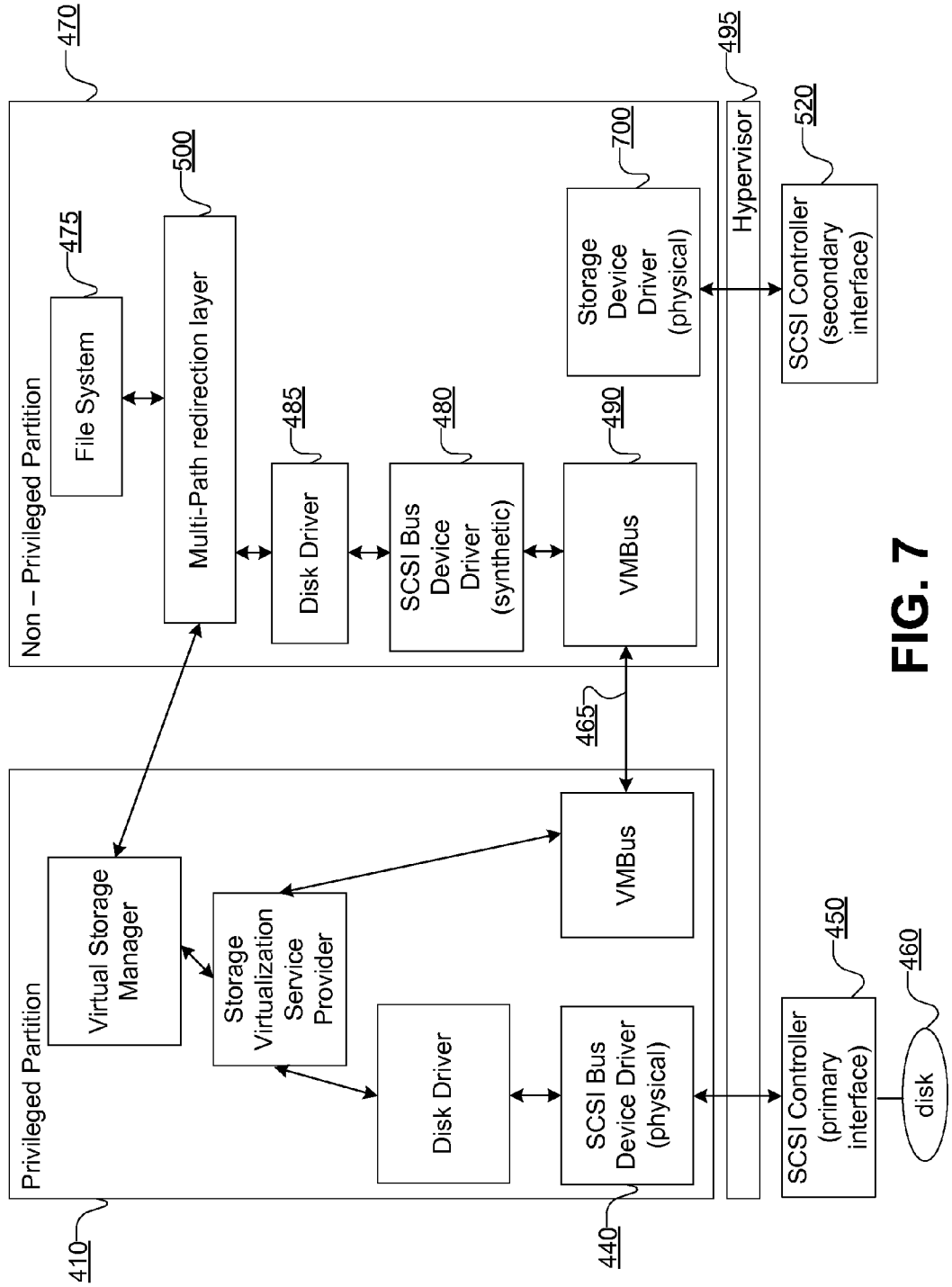
FIG. 7 depicts an exemplary system diagram illustrating a process for implementing the present disclosure.

Referring to FIG. 7, illustrated are further exemplary processes for setting up a second I/O stack. A storage device driver 700 may be set up for the secondary controller interface 520. Using the synthetic storage stack 710, the boot device may be searched for the files related to the device driver.

The SCSI bus device driver 700 in the non-privileged partition 470 may now create a child device representing the disk. However, the non-privileged partition 470 does not currently own the disk 460 which is under the control of privileged partition 410. As a result, normal methods for creating this part of the stack may not work since the device is not able to send I/O to the disk to find its properties.

Figure 8:
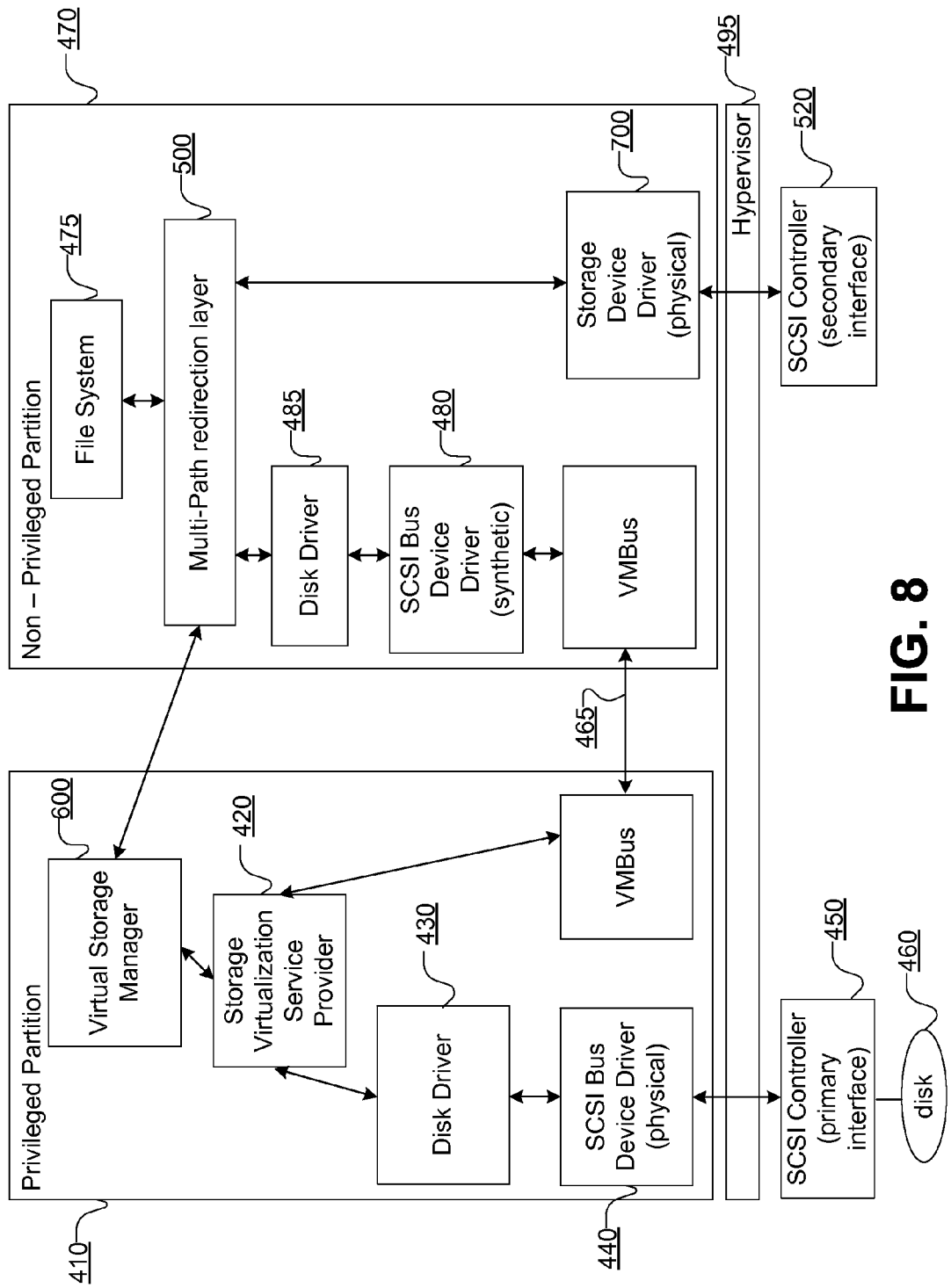
FIG. 8 depicts an exemplary system diagram illustrating a process for implementing the present disclosure.

Referring to FIG. 8, the SCSI bus device driver 700 may send a request to the multi-path redirection layer 500 for information about the disk(s) that the SCSI bus device driver 700 may eventually own. The multi-path redirection layer 500 may then respond with a handle to the existing disk driver 485.

Figure 9:
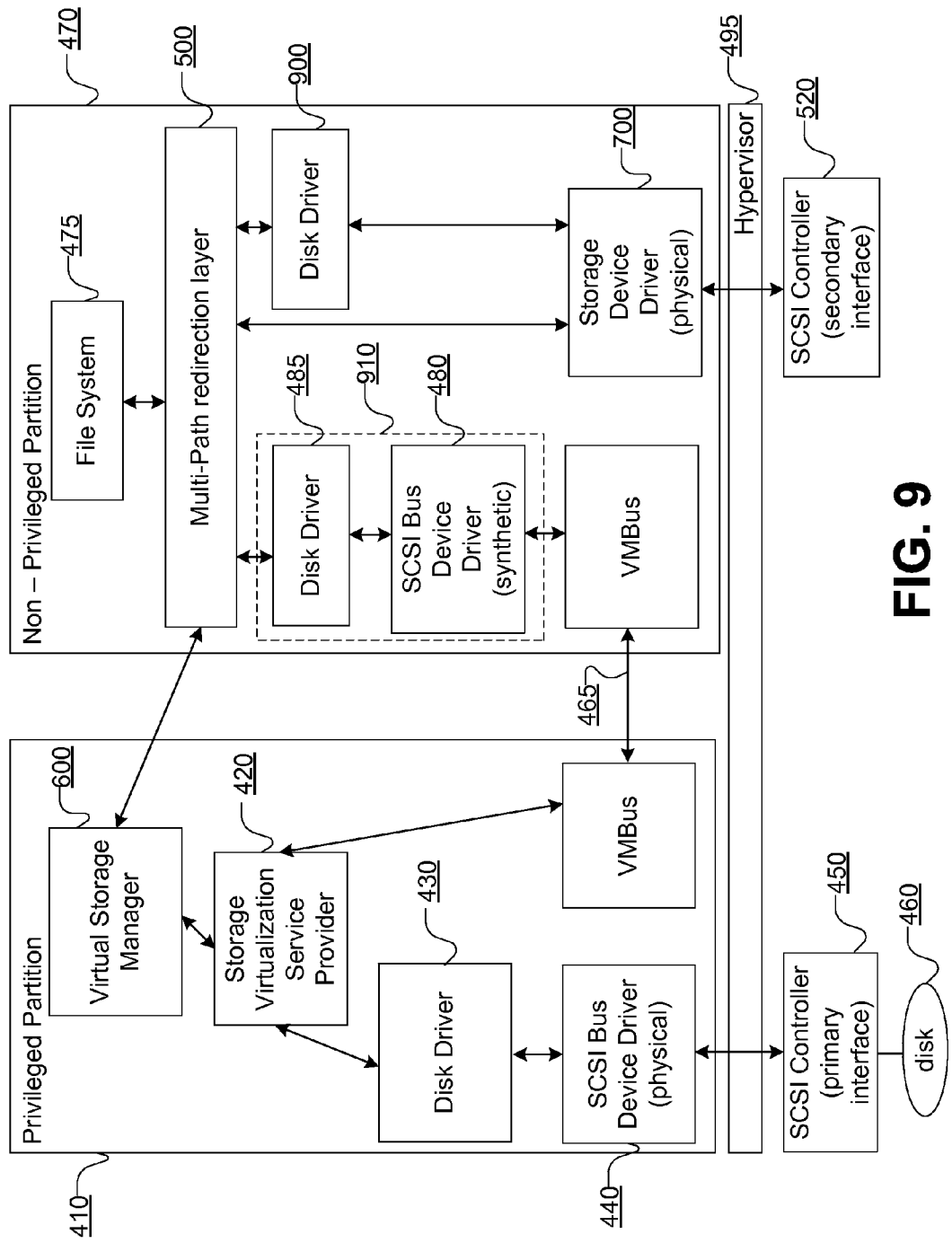
FIG. 9 depicts an exemplary system diagram illustrating a process for implementing the present disclosure.

An operating system I/O manager may manage the communication between applications and the interfaces provided by device drivers. An I/O manager may further comprise a Plug and Play manager for managing the I/O functionality and recognizing when a device is added to the system. Referring to FIG. 9, the SCSI bus driver 700 in the non-privileged partition 470 may create an object representing the disk 460 and report the object to the Plug-and-Play manager which may then set up a driver 900 for the disk 460. Normally a driver 900 could not be set up without the SCSI controller interface 520 sending I/O to the disk 460. In this case, the driver 900 can be set up because the necessary I/O is redirected down the synthetic storage stack 910 using the handle to the disk driver 485 that the multi-path redirection layer 500 provided to the SCSI controller interface 520. The multi-path redirection layer 500 may then open a handle to new disk object 900 and its associated driver.

Figure 10:
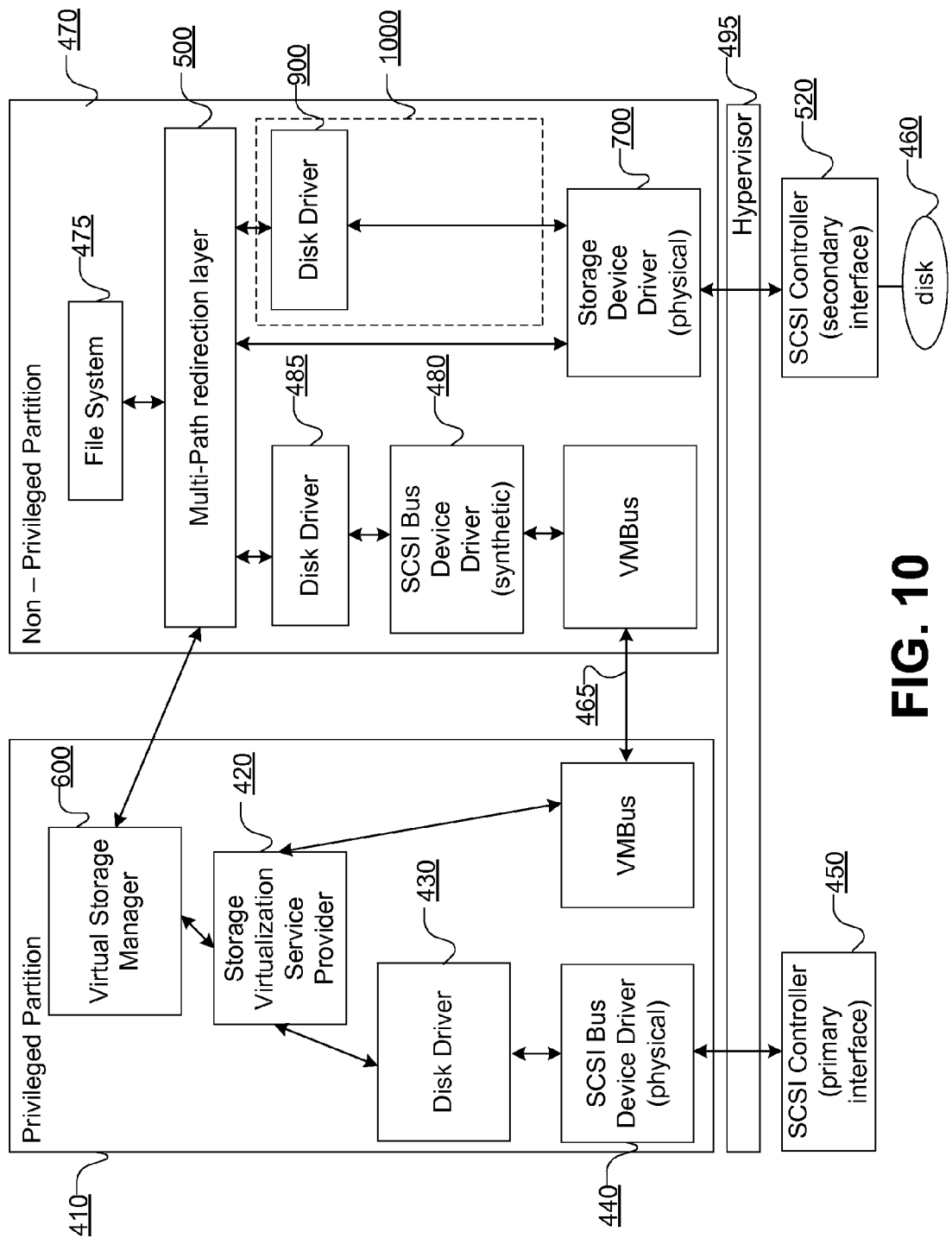
FIG. 10 depicts an exemplary system diagram illustrating a process for implementing the present disclosure.

Referring to FIG. 10, the multi-path redirection layer 500 may send a message to the virtual storage manager 600. The virtual storage manager 600 may send a message to the SCSI bus device driver 440 for the SCSI controller's primary interface 450. The SCSI controller's primary interface 450 may then relinquish control of the disk 460 to the SCSI controller's secondary interface 520 as shown. At this point, the multi-path redirection layer 500 may direct I/O from the file system 475 down through the physical stack 1000 in the non-privileged partition 470.

The presently disclosed aspects can be implemented as systems, methods, computer executable instructions residing in computer readable media, and so on. Thus, any disclosure of any particular system, method, or computer readable medium is not confined there to, but rather extends to other ways of implementing the disclosed subject matter.

Figure 11:
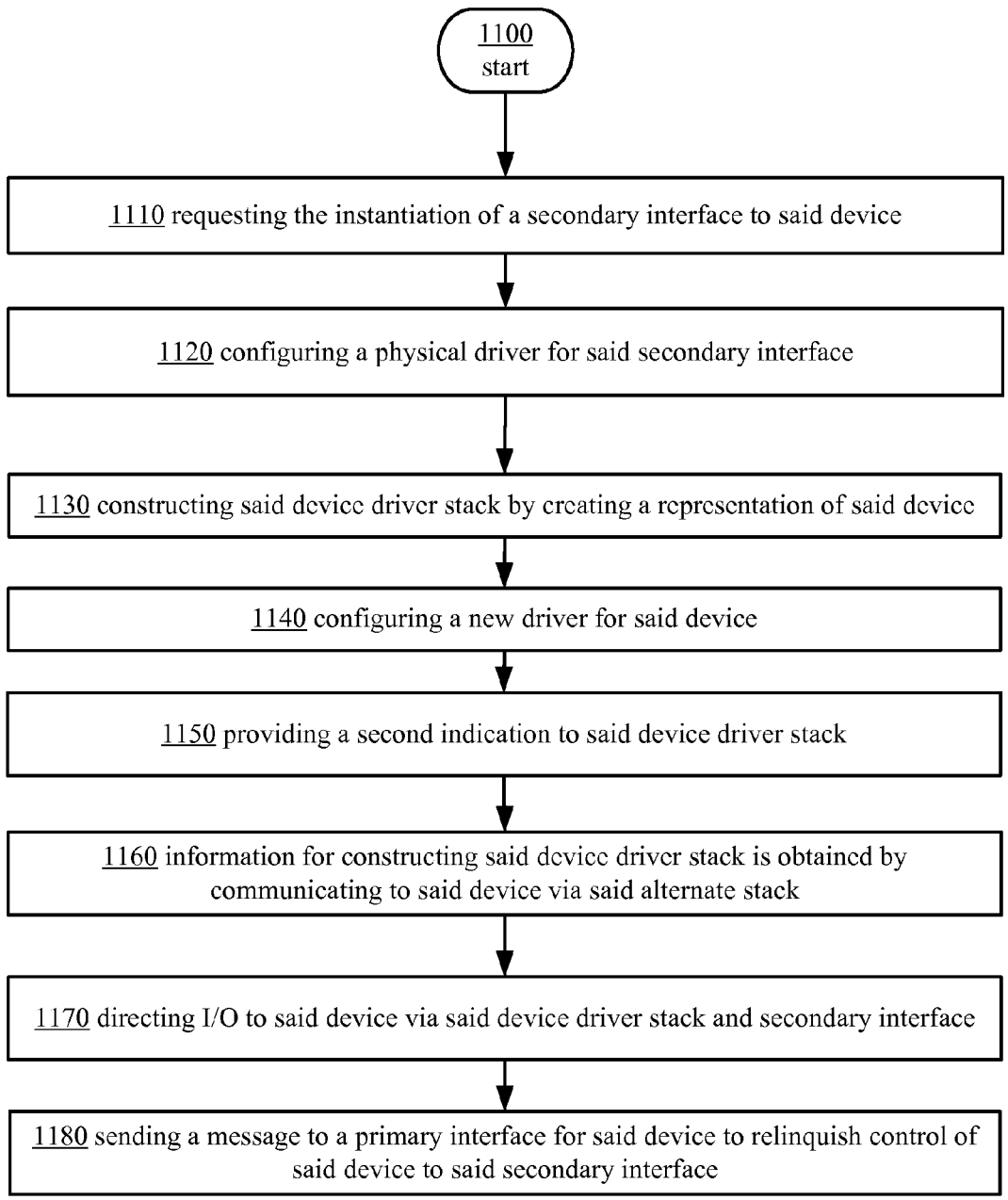
FIG. 11 illustrates an example of an operational procedure for constructing a device driver stack in a virtual machine that does not control the device associated with the stack.
Figure 12:
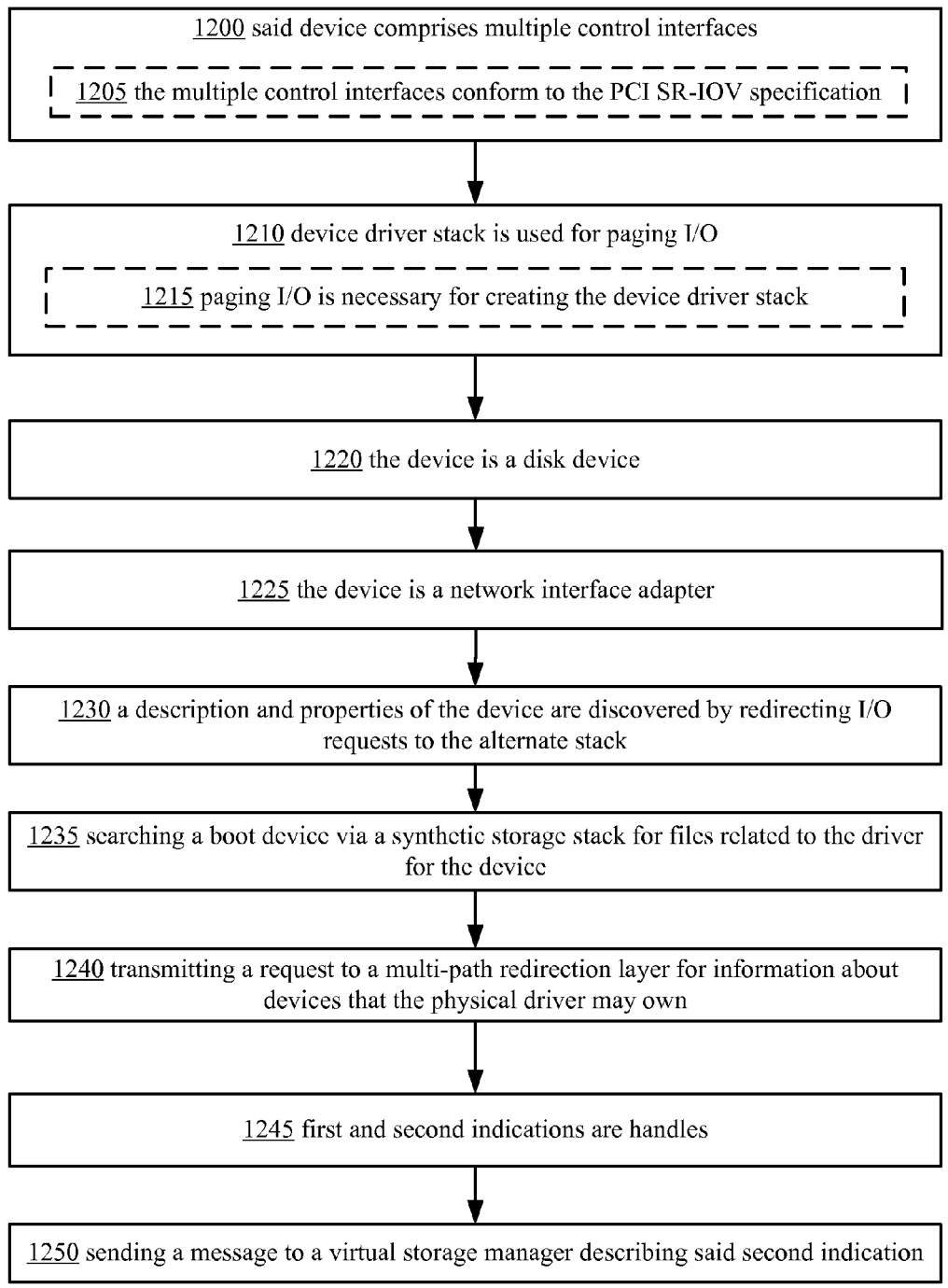
FIG. 12 illustrates an example of an operational procedure for constructing a device driver stack in a virtual machine that does not control the device associated with the stack.

FIGS. 11 and 12 depict an example of an operational procedure for constructing a device driver stack in a virtual machine that does not control the device associated with the stack. The procedure may include operations 1100, 1110, 1120, 1130, 1140, 1150, 1160, 1170, and 1180. Referring to FIG. 11, operation 1100 begins the operational procedure and in operation 1110 a request may be transmitted to instantiate a secondary interface for the device. A physical driver for the secondary interface may be configured 1120. Operation 1130 illustrates constructing said device driver stack by creating a representation of said device. Operation 1140 illustrates configuring a new driver for said device, and operation 1150 illustrates providing a second indication to said device driver stack. Operation 1160 illustrates that information for constructing said device driver stack is obtained by communicating to said device via said alternate stack. Operation 1170 illustrates directing I/O to said device via said device driver stack and secondary interface. Operation 1180 illustrates sending a message to a primary interface for said device to relinquish control of said device to said secondary interface.

Continuing with FIG. 12, operation 1200 illustrates that the device may optionally comprise multiple control interfaces. Operation 1205 illustrates that the multiple control interfaces may optionally conform to the PCI SR-IOV specification. In an embodiment, the device driver stack may be used for paging I/O 1210, and in operation 1215 paging I/O may be necessary for creating the device driver stack.

Operation 1220 illustrates that in one embodiment the device is a disk device. In another embodiment 1225, the device is a network interface adapter. In various embodiments, a description and properties of the device are discovered 1230 by redirecting I/O requests to the alternate stack.

In operation 1235 a boot device may be searched via a synthetic storage stack for files related to the driver for the device. In operation 1240 illustrates transmitting a request for information about devices that the physical driver may own to a multi-path redirection layer.

In one embodiment, the indications may be a handle 1245. In another embodiment, a message to the virtual storage manager may be sent 1250, the message describing the indication.

Figure 13:
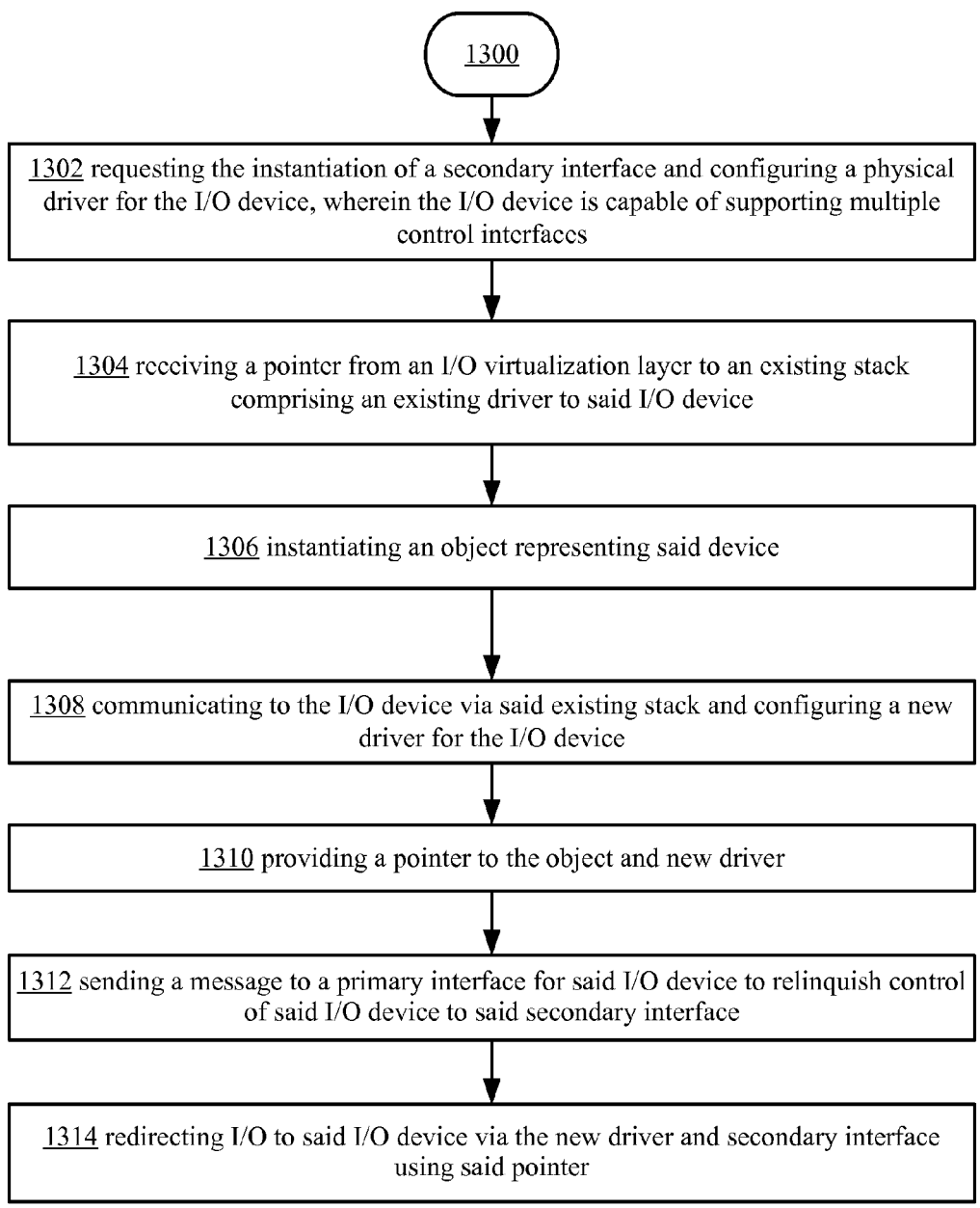
FIG. 13 illustrates an example of an operational procedure for creating multiple paths to an I/O device used for paging code or data in a virtual machine environment.
Figure 14:
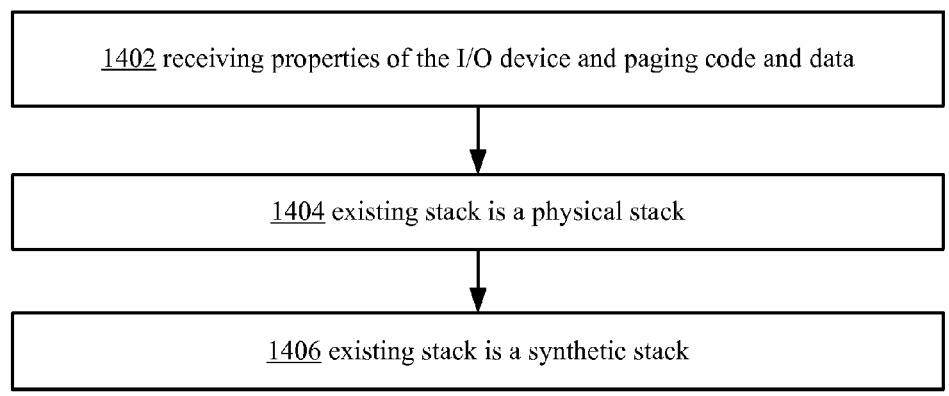
FIG. 14 illustrates an example of an operational procedure for creating multiple paths to an I/O device used for paging code or data in a virtual machine environment.

FIGS. 13 and 14 depict an exemplary operational procedure for creating multiple paths to an I/O device used for paging code or data in a virtual machine environment. The procedure may include operations 1300, 1302, 1304, 1306, 1308, 1310, 1312, and 1314. Referring to FIG. 13, operation 1300 begins the operational procedure and operation 1302 requesting the instantiation of a secondary interface and configuring a physical driver for the I/O device, wherein the I/O device is capable of supporting multiple control interfaces. Operation 1304 illustrates receiving a pointer from an I/O virtualization layer to an existing stack comprising an existing driver to said I/O device, and in operation 1306 an object representing the device may be instantiated.

Operation 1308 illustrates communicating to the I/O device via said existing stack and configuring a new driver for the I/O device. A pointer to the object and new driver may be provided 1310. Operation 1312 illustrates sending a message to a primary interface for said I/O device to relinquish control of said I/O device to said secondary interface. Operation 1314 illustrates redirecting I/O to said I/O device via the new driver and secondary interface using said pointer.

Continuing with FIG. 14, in operation 1402 illustrates receiving properties of the I/O device and paging code and data. Operation 1404 illustrates that in one embodiment the existing stack is a physical stack. In another embodiment the existing stack may be a synthetic stack 1406.

Figure 15:
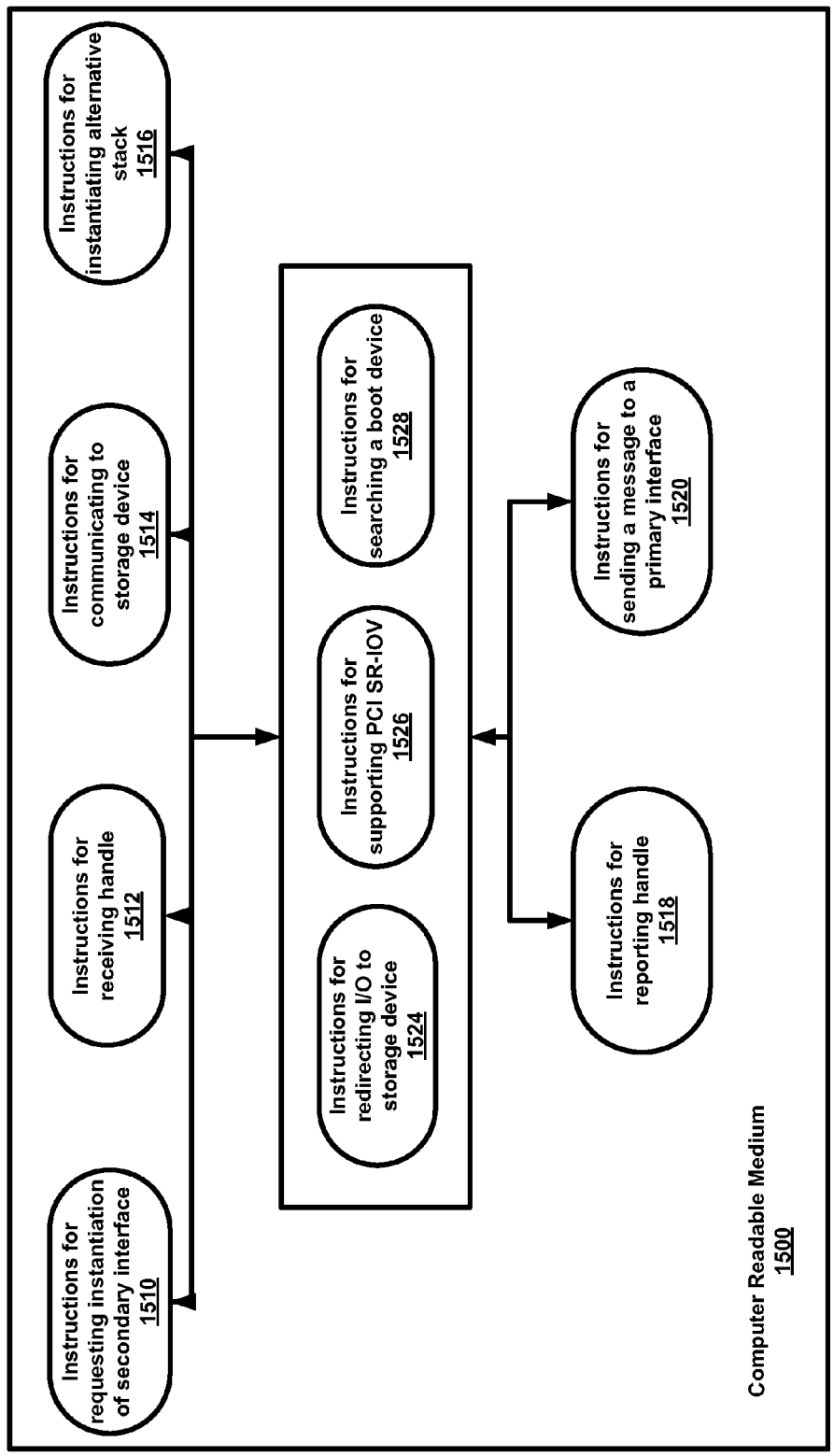
FIG. 15 illustrates a computer readable medium bearing computer executable instructions discussed with respect to FIGS. 1-10, above.

Any of the above mentioned aspects can be implemented in methods, systems, computer readable media, or any type of manufacture. For example, per FIG. 15, a computer readable medium can store thereon computer executable instructions for creating an alternative I/O stack for a storage device in a virtualized I/O environment, wherein the storage device is used for paging code and data and the alternative I/O stack is created while paging with the storage device continues through an existing stack. Such media can comprise a first subset of instructions for requesting the instantiation of a secondary interface and configuring a secondary physical driver for the storage device 1510; a second subset of instructions for receiving a handle to the existing stack 1512; a third subset of instructions for identifying the existing stack using said handle and communicating to the storage device via the existing stack 1514; a fourth set of instructions for instantiating said alternative I/O stack for the storage device, the alternative I/O stack comprising an object representing said storage device and a driver for the storage device 1516; a fifth set of instructions for reporting a handle to said alternative I/O stack 1518; and a sixth set of instructions for sending a message to a primary interface for said storage device to relinquish control of said storage device to said secondary interface 1520. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 1526 for redirecting I/O to the storage device via the alternative I/O stack. The instructions can further comprise instructions to support an embodiment wherein the storage device is PCI SR-IOV compliant 1528, and instructions for searching a boot device via the existing stack for files related to the driver for the storage device.

Figure 1C:
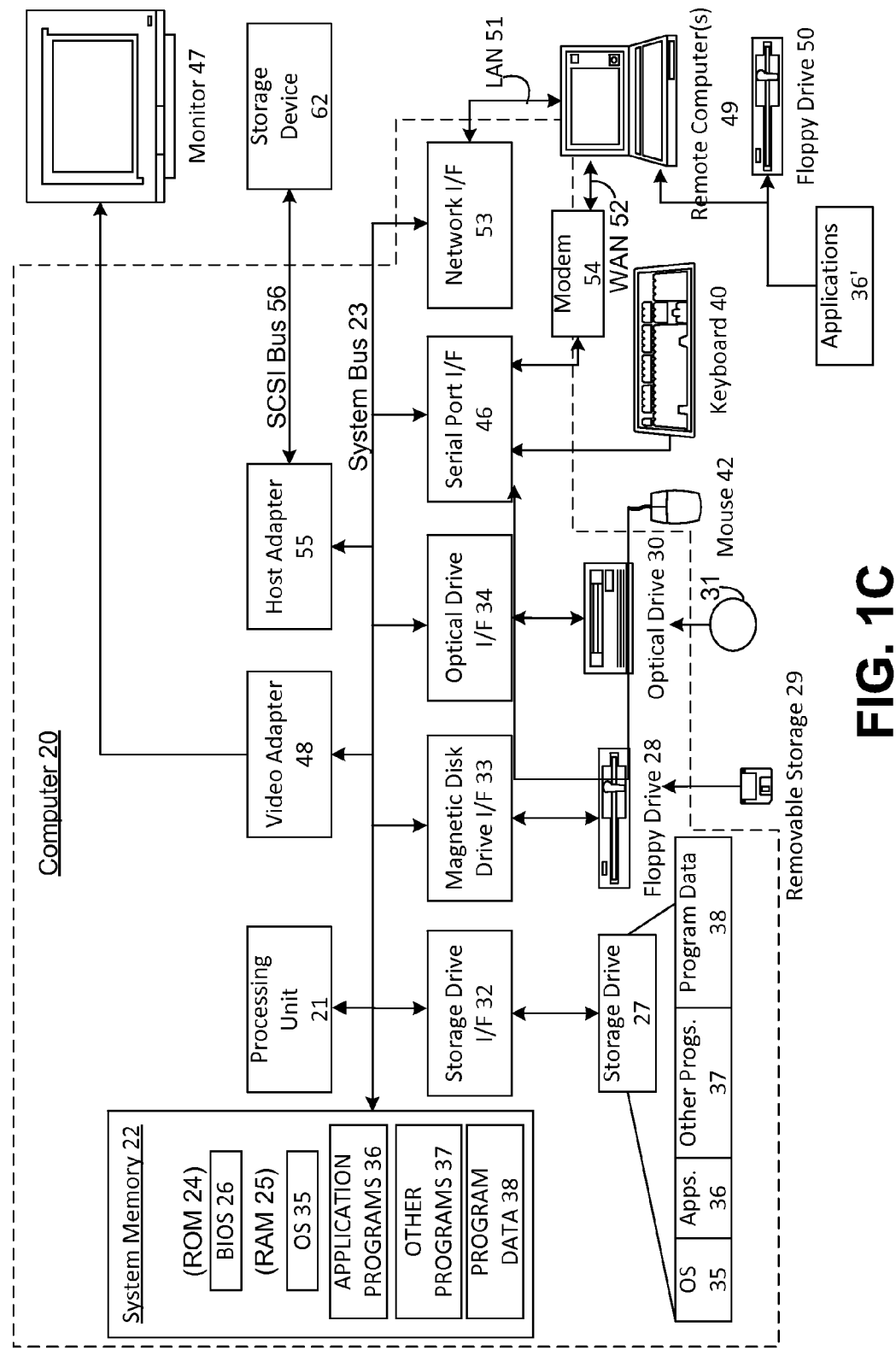
FIG. 1C depicts an example computer system wherein aspects of the present disclosure can be implemented.

As described above, aspects of the invention may execute on a programmed computer. FIG. 1C and the following discussion is intended to provide a brief description of a suitable computing environment in which aspects of the present disclosure may be implemented. One skilled in the art can appreciate that the computer system of FIG. 1C can in some embodiments effectuate various aspects of FIGS. 1A and 1B. In these example embodiments, the server and client can include some or all of the components described in FIG. 1C and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Referring to FIG. 1C, a computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1C. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for building a device driver stack in a virtual machine partition that does not physically control the device represented by the stack. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for constructing a device driver stack by a computing device comprising at least one processor, comprising:
    generating, by the computing device, a secondary interface to a device and configuring a physical driver for said secondary interface;
    constructing, by the computing device, said device driver stack by creating a representation of said device, wherein information for constructing said device driver stack is obtained by communicating to said device via an alternate stack; and
    sending, by the computing device, a message to a primary interface for said device to relinquish control of said device to said secondary interface.

2. The method according to claim 1, wherein said device comprises multiple control interfaces.

3. The method according to claim 1, wherein said device driver stack is used for paging I/O.

4. The method according to claim 3, wherein said paging I/O is used for creating the device driver stack.

5. The method according to claim 1, wherein said device is a storage device.

6. The method according to claim 1, wherein said device is a network interface adapter.

7. The method according to claim 1, wherein a description and properties of said device are obtained by redirecting I/O requests to said alternate stack.

8. The method according to claim 1, wherein said configuring a physical driver further comprises searching a boot device via a synthetic storage stack for files related to the physical driver.

9. The method according to claim 1, further comprising transmitting a request to a multi-path redirection layer for information about devices associated with the physical driver.

10. The method according to claim 1, further comprising receiving an indication of the alternate stack.

11. The method according to claim 1 further comprising configuring a new driver for said device and providing an indication of the new driver to said device driver stack.

12. A system for creating paths to an I/O device, comprising:
    at least one processor; and
    at least one memory communicatively coupled to said at least one processor, the memory having stored therein computer-executable instructions that, when executed by the at least one processor, cause at least:
        generating a secondary interface and configuring a physical driver for the I/O device;
        receiving a pointer from an I/O virtualization layer to an existing stack comprising a driver for the I/O device;
        communicating to the I/O device via said existing stack and configuring a new driver for the I/O device; and
        sending a message to a primary interface for said I/O device to relinquish control of said I/O device to said secondary interface.

13. The system of claim 12 wherein said communicating to the I/O device further comprises receiving properties of the I/O device and paging code and data.

14. The system according to claim 13, wherein said existing stack is a physical stack.

15. The system according to claim 13, wherein said existing stack is a synthetic stack.

16. A computer readable storage medium excluding signals, the medium having stored thereon computer executable instructions for creating an alternative I/O stack for a storage device in a virtualized I/O environment, comprising instructions for:
    requesting instantiation of a secondary interface and configuring a secondary physical driver for the storage device;
    receiving a handle to an existing stack;
    identifying the existing stack using said handle and communicating to the storage device via the existing stack;
    instantiating said alternative I/O stack for the storage device, the alternative I/O stack comprising an object representing said storage device and a driver for the storage device; and
    sending a message to a primary interface for said storage device to relinquish control of said storage device to said secondary interface.

17. The computer readable storage medium of claim 16 further comprising instructions for redirecting I/O to said storage device via the alternative I/O stack.

18. The computer readable storage medium of claim 16 wherein said storage device comprises multiple control interfaces.

19. The computer readable storage medium of claim 16 wherein said configuring a secondary physical driver comprises searching a boot device via the existing stack for files related to the secondary physical driver for the storage device.

20. The computer readable storage medium of claim 16, wherein said storage device is used for paging code and data and said alternative I/O stack is created while paging with the storage device continues through the existing stack.

* * * * *